(12) United States Patent
Townsley

(10) Patent No.: US 10,829,991 B2
(45) Date of Patent: *Nov. 10, 2020

(54) LATERALLY REPOSITIONABLE ROLLER SHADE

(71) Applicant: MCD Innovations, Inc., McKinney, TX (US)

(72) Inventor: David M. Townsley, McKinney, TX (US)

(73) Assignee: MCD Innovations, Inc., McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,044

(22) Filed: Aug. 7, 2017

(65) Prior Publication Data

US 2017/0335624 A1 Nov. 23, 2017

Related U.S. Application Data

(63) Continuation of application No. 14/097,147, filed on Dec. 4, 2013, now Pat. No. 9,725,949.

(60) Provisional application No. 61/733,669, filed on Dec. 5, 2012.

(51) Int. Cl.
| | |
|---|---|
| *A47G 5/02* | (2006.01) |
| *E06B 9/56* | (2006.01) |
| *E06B 9/42* | (2006.01) |
| *E06B 9/60* | (2006.01) |
| *B60J 1/20* | (2006.01) |
| *E06B 9/68* | (2006.01) |
| *E06B 9/24* | (2006.01) |

(52) U.S. Cl.
CPC ............ *E06B 9/56* (2013.01); *B60J 1/205* (2013.01); *B60J 1/2083* (2013.01); *E06B 9/42* (2013.01); *E06B 9/60* (2013.01); *E06B 9/68* (2013.01); *E06B 2009/2482* (2013.01)

(58) Field of Classification Search
CPC ..... E06B 9/42; E06B 9/68; E06B 9/40; E06B 9/58; E06B 2009/405; A47H 15/00; A47H 15/02; A47H 15/04; B60J 1/205
USPC .................................................. 160/243, 343
See application file for complete search history.

(56) References Cited

U.S. PATENT DOCUMENTS

| | | | | |
|---|---|---|---|---|
| 1,056,315 | A | * | 3/1913 | Balazs ..................... A47H 5/06 160/343 |
| 1,459,522 | A | * | 6/1923 | Woods ..................... E06B 9/01 160/221 |
| 1,550,899 | A | * | 8/1925 | Gilbert ..................... E06B 9/64 160/21 |
| 1,812,881 | A | * | 7/1931 | Kirsch ..................... A47H 5/06 248/262 |
| 1,823,909 | A | * | 9/1931 | Meier ..................... A47H 5/06 160/343 |
| 1,862,385 | A | * | 6/1932 | Morey ................... A47H 5/032 160/250 |
| 2,032,842 | A | * | 3/1936 | Gould .................... A47H 1/022 211/105.6 |
| 2,052,828 | A | * | 9/1936 | Hucke ..................... E06B 9/54 160/250 |

(Continued)

*Primary Examiner* — Johnnie A. Shablack
(74) *Attorney, Agent, or Firm* — Ferguson Braswell Fraser Kubasta PC; Elizabeth Philip Dahm; Kelly J. Kubasta

(57) ABSTRACT

A roller shade may be retracted and extended. In various implementations, when a roller shade is extended it may be laterally repositioned. The roller shade may include a track and a travelling member.

20 Claims, 13 Drawing Sheets

(56) References Cited

U.S. PATENT DOCUMENTS

| | | | | |
|---|---|---|---|---|
| 2,605,987 A * | 8/1952 | Brown | F25D 29/005 | 108/146 |
| 2,801,690 A * | 8/1957 | Bennett | A47H 5/06 | 160/343 |
| 3,003,552 A * | 10/1961 | Eilenberger | A47H 5/06 | 160/331 |
| 3,110,506 A * | 11/1963 | O'Brien | B60P 7/15 | 211/105.6 |
| 3,208,507 A * | 9/1965 | Breen | E06B 9/364 | 160/168.1 V |
| 3,400,425 A * | 9/1968 | Polizzi | A47H 5/06 | 16/95 D |
| 3,774,665 A * | 11/1973 | Bourne | A47H 5/06 | 16/87.6 R |
| 3,789,904 A * | 2/1974 | Takazawa | A47H 1/00 | 160/120 |
| 4,023,609 A * | 5/1977 | Rosenquist | A47H 5/06 | 160/343 |
| 4,289,292 A * | 9/1981 | Kunjunnon | F16M 11/046 | 211/117 |
| 4,305,448 A * | 12/1981 | Stoll | A47H 5/02 | 160/331 |
| 4,766,941 A * | 8/1988 | Sloop | E06B 9/24 | 160/241 |
| 4,832,104 A * | 5/1989 | De Labarthe | E04B 7/166 | 160/343 |
| 4,926,922 A * | 5/1990 | Shimazaki | A47H 5/06 | 160/331 |
| 4,979,775 A * | 12/1990 | Klose | B60J 1/205 | 296/97.1 |
| 5,070,927 A * | 12/1991 | Chen | A47H 5/06 | 160/171 |
| 5,135,279 A * | 8/1992 | Beatty | B60J 1/205 | 160/171 |
| 5,899,255 A * | 5/1999 | Petracini | A47H 5/06 | 160/343 |
| 6,004,298 A * | 12/1999 | Levander | A61M 5/2448 | 604/211 |
| 6,024,156 A * | 2/2000 | Chu | A47H 5/0325 | 160/331 |
| RE37,068 E * | 2/2001 | Beatty | B60J 1/205 | 160/171 |
| 6,460,593 B1 * | 10/2002 | Floyd | B60J 1/205 | 160/250 |
| 7,201,417 B2 * | 4/2007 | Teo | B60R 5/047 | 160/250 |
| 7,621,313 B2 * | 11/2009 | Pham | E06B 9/40 | 160/23.1 |
| 7,694,711 B2 * | 4/2010 | Okachi | E06B 9/54 | 160/122 |
| 7,810,544 B2 * | 10/2010 | Spiess | B66B 13/305 | 160/242 |
| 8,025,088 B2 * | 9/2011 | Kim | A47H 23/06 | 160/120 |
| 8,167,020 B2 * | 5/2012 | Shanahan | E06B 7/24 | 160/122 |
| 8,550,142 B2 * | 10/2013 | Gaskill | E06B 9/40 | 160/120 |
| 8,757,239 B2 * | 6/2014 | Colson | A47H 2/00 | 160/265 |
| 8,839,841 B2 * | 9/2014 | Koop | E06B 9/50 | 160/325 |
| 9,095,907 B2 * | 8/2015 | Mullet | E06B 9/72 | |
| 9,095,908 B2 * | 8/2015 | Mullet | E06B 9/72 | |
| 9,540,873 B1 * | 1/2017 | Townsley | B60J 1/205 | |
| 9,725,949 B2 * | 8/2017 | Townsley | B60J 1/205 | |
| 2009/0173454 A1 * | 7/2009 | Cheng | E06B 9/40 | 160/120 |
| 2011/0031198 A1 * | 2/2011 | Trettin | A47H 1/022 | 211/123 |
| 2013/0098564 A1 * | 4/2013 | Jang | E06B 9/40 | 160/120 |
| 2014/0076503 A1 * | 3/2014 | Mullet | E06B 9/72 | 160/84.02 |
| 2014/0076505 A1 * | 3/2014 | Mullet | E06B 9/72 | 160/108 |
| 2014/0076508 A1 * | 3/2014 | Mullet | E06B 9/72 | 160/310 |
| 2014/0158312 A1 * | 6/2014 | Townsley | B60J 1/205 | 160/243 |
| 2015/0107788 A1 * | 4/2015 | Mullet | A47H 1/02 | 160/405 |
| 2015/0272370 A1 * | 10/2015 | Mullet | E06B 9/72 | 29/428 |
| 2016/0083998 A1 * | 3/2016 | Grutzner | E06B 9/44 | 160/238 |
| 2016/0130865 A1 * | 5/2016 | De Muelenaere | E04F 10/10 | 160/113 |
| 2017/0335624 A1 * | 11/2017 | Townsley | B60J 1/205 | |

* cited by examiner

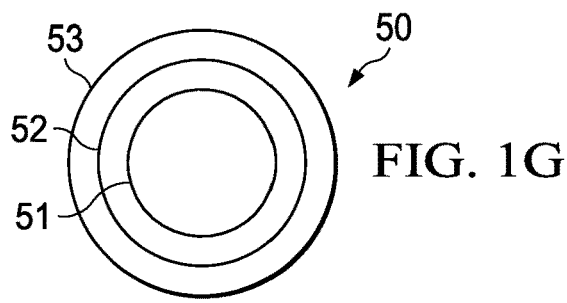
FIG. 1G
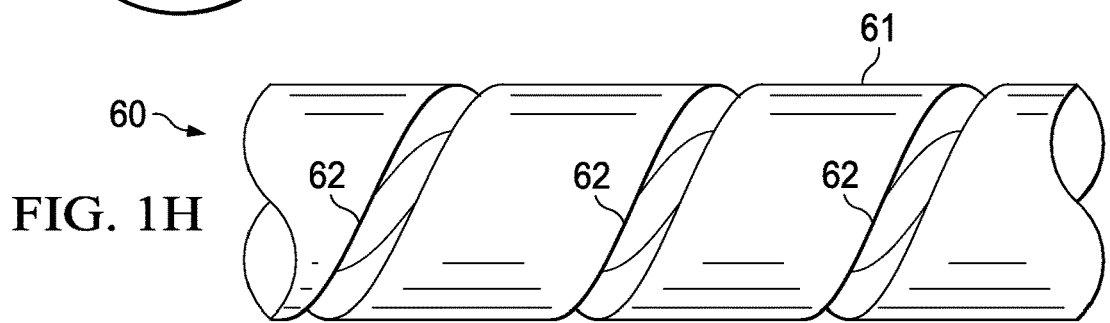
FIG. 1H
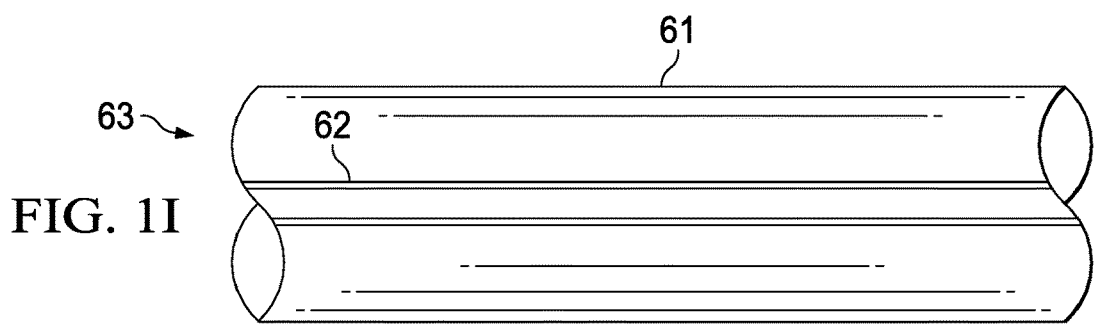
FIG. 1I
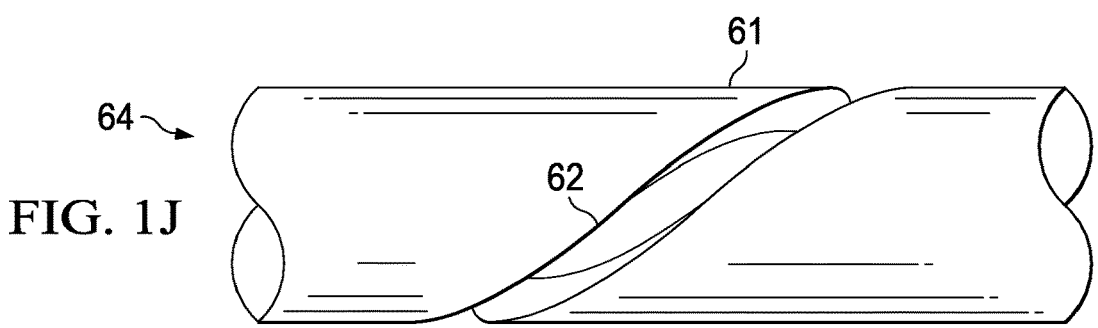
FIG. 1J
FIG. 1K  FIG. 1L  FIG. 1M
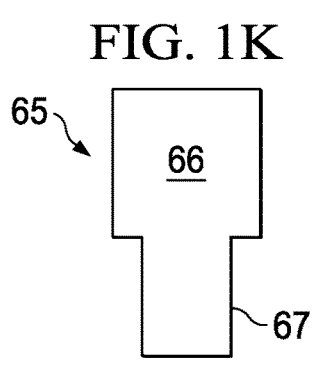
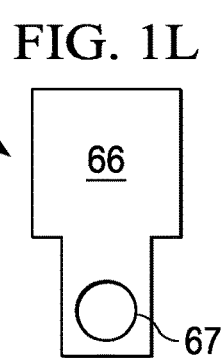
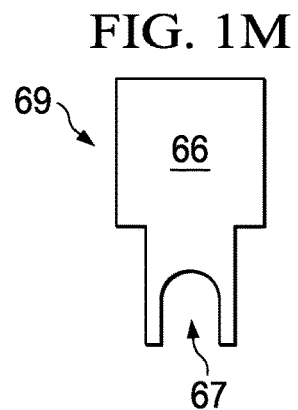

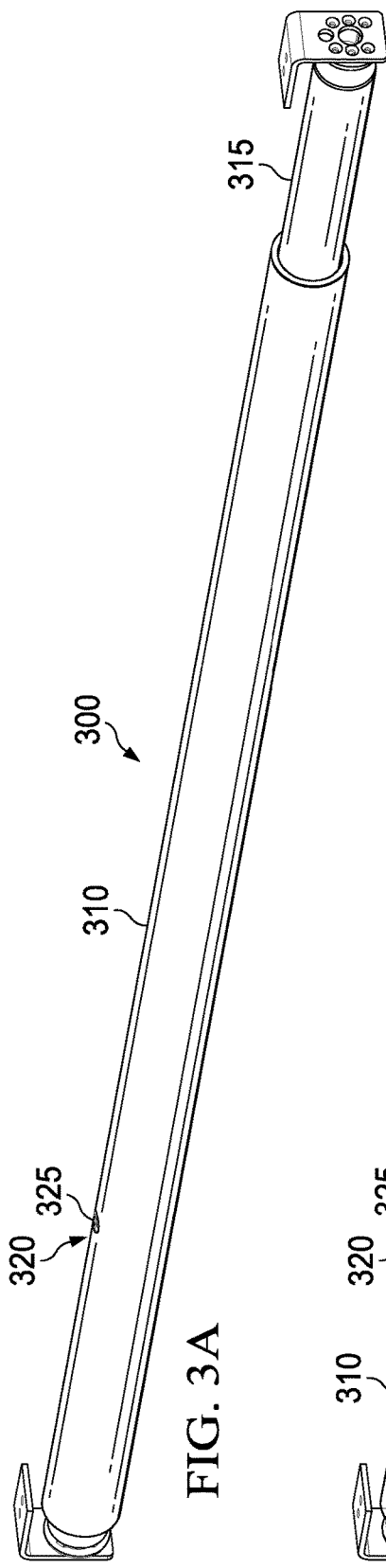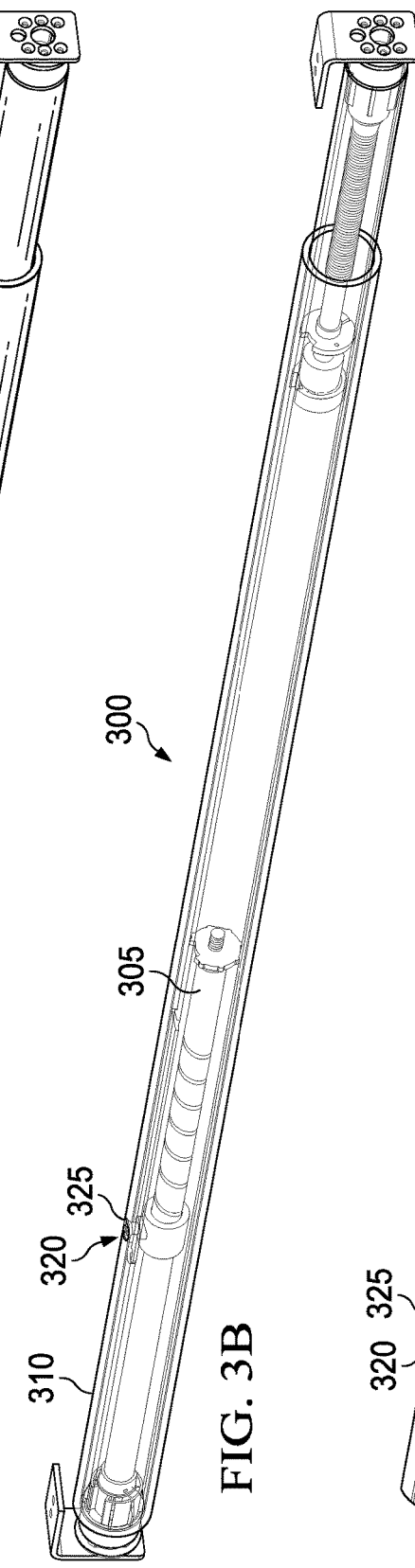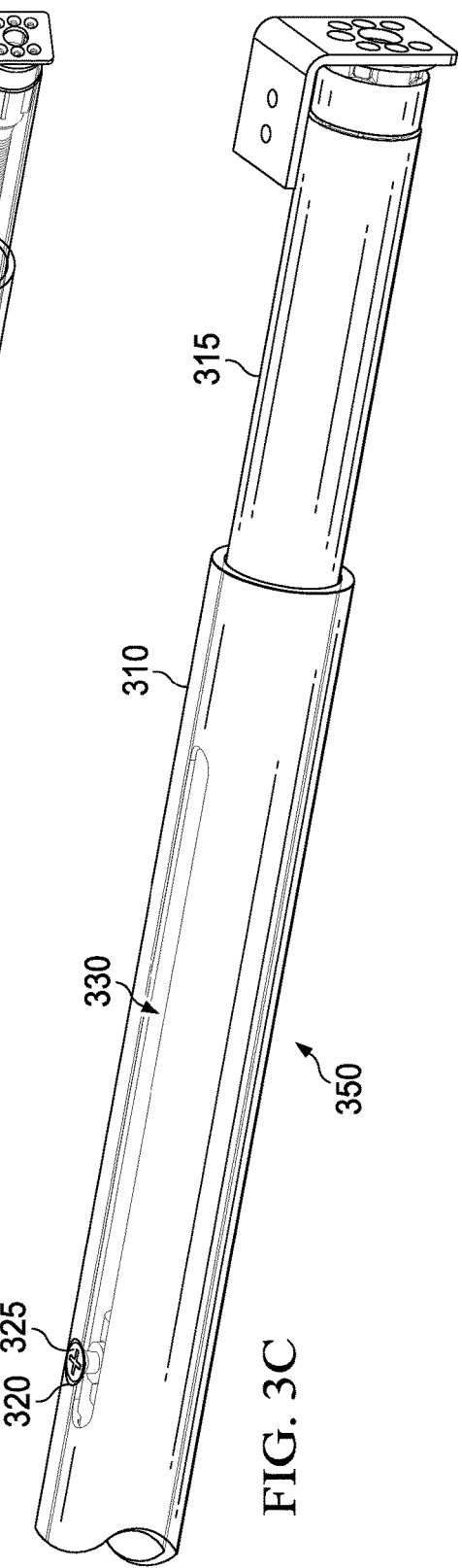

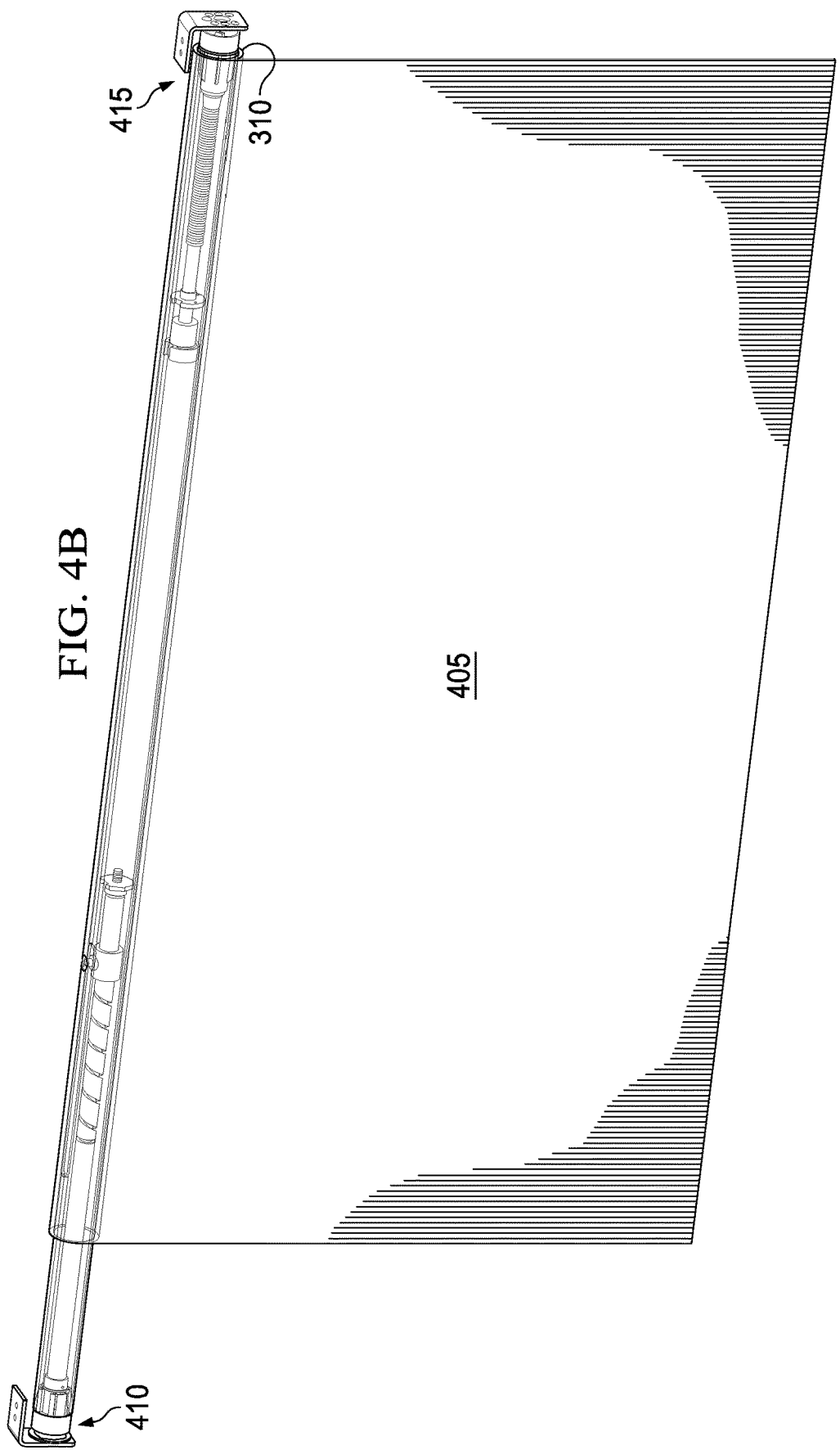

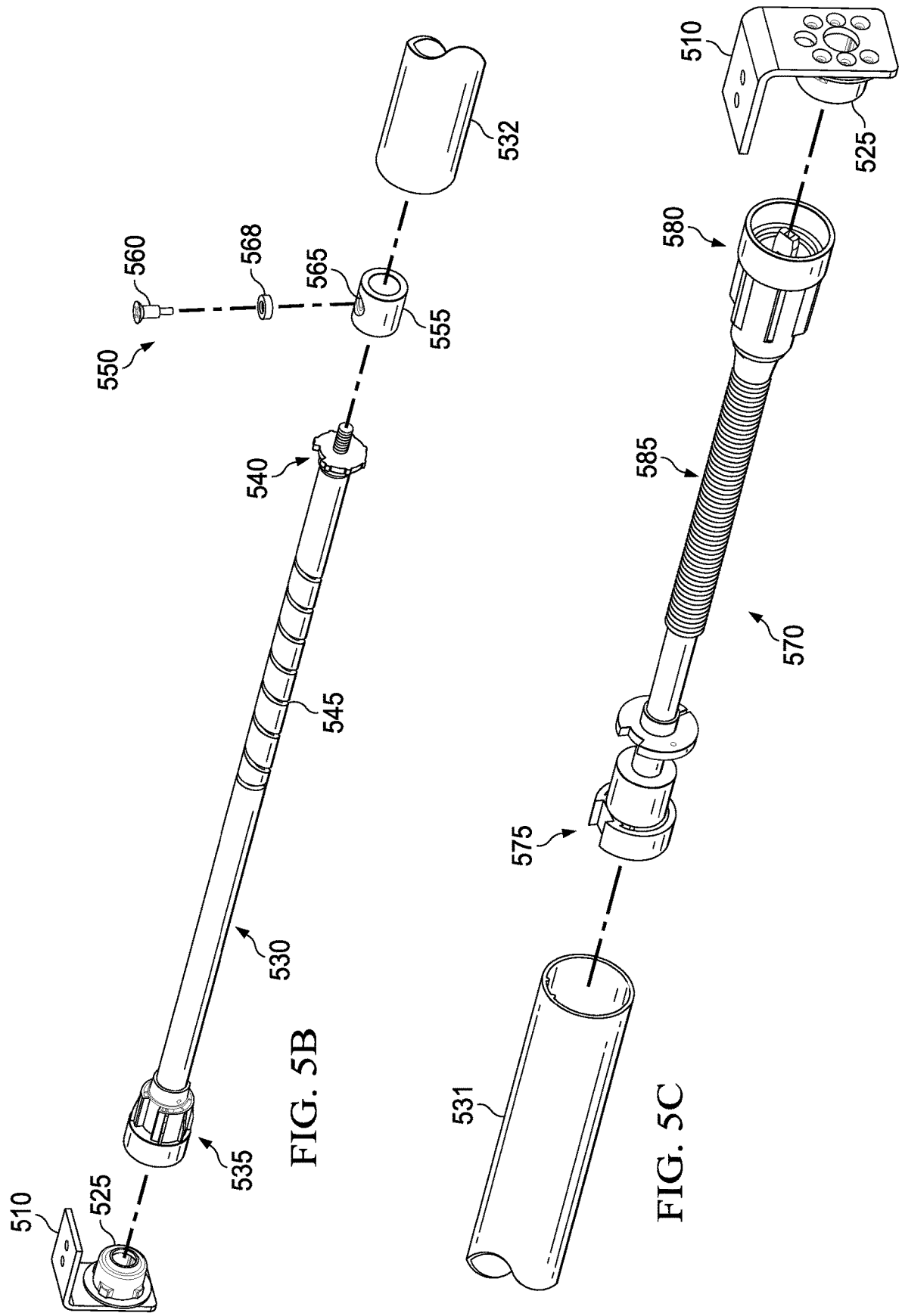

LATERALLY REPOSITIONABLE ROLLER SHADE

CROSS-REFERENCE TO RELATED APPLICATIONS

This application is a continuation of U.S. patent application Ser. No. 14/097,147, entitled "Laterally Repositionable Roller Shade" filed on Dec. 4, 2013 and issued as U.S. Pat. No. 9,725,949 on Aug. 8, 2017, which claims priority to U.S. Provisional Patent Application No. 61/733,669 entitled "Sway Shade Roller Mechanism," filed on Dec. 5, 2012, both of which are hereby incorporated by reference for all purposes.

TECHNICAL FIELD

The present invention relates to roller shades.

BACKGROUND

Roller shades may be used in a variety of applications, such as, but not limited to, recreational vehicles, boats, and/or houses. The roller shades may include a tube with a shade. The shade may be rolled about the tube such that the shade may be extended from the tube to provide shade and/or retracted such that at least a portion of the shade wraps around the tube. Roller shades may include, but is not limited to, shades that provide light filtering, light blockage, and/or privacy.

SUMMARY

In various implementations, a roller shade may include a first end and a second opposing end. The roller shade may include a length disposed between the first end and the second end. The roller shade may include a shade to retract and automatically laterally reposition to a first position along the length and/or extend and automatically laterally reposition to a second position along the length. The second position may dispose the shade closer to the second end than the first position.

Implementations may include one or more of the following. Automatically laterally repositioning the shade may occur approximately concurrently with retracting the shade. Automatically laterally repositioning the shade may occur approximately concurrently with extending the shade. The roller shade may include a first member, which includes a track. Laterally repositioning the shade may include laterally repositioning the shade using the track. The roller shade may include a first member that includes a track and a traveling member adapted to move along the track to laterally reposition the shade. The shade may be coupled to the traveling member. In some implementations, the first member of the roller shade may include a track, which includes a spiral track. The traveling member of the roller shade may move along the track to laterally reposition the shade. The shade may be coupled to the traveling member. The first member of the roller shade may include a track, which includes recess. The traveling member of the roller shade may include a protrusion. The protrusion of the travelling member may be at least partially received by the recess such that the traveling member moves along the track to laterally reposition the shade. In some implementations, the first member of the roller shade may include a track, which includes a guide. The traveling member may include a receiving member. The receiving member may be at least partially received by the guide such that the receiving member moves along the guide as the traveling member moves along the track to laterally reposition the shade.

In various implementations, a roller shade movement device may include a first member and a travelling member. The first member may include a track. The traveling member may move along the track to automatically laterally move a shade of a roller shade when the shade is vertically moved. A shade of the roller shade may be coupled to the traveling member.

Implementations may include one or more of the following features. The track may include a spiral track. In some implementations, the track may include recess and traveling member may include a protrusion. The protrusion may be at least partially received by the recess such that the traveling member moves along the track to laterally reposition the shade. The track may include a guide and the traveling member may include a receiving member. The receiving member may be at least partially received by the guide such that the receiving member moves along the guide as the traveling member moves along the track to laterally reposition the shade. In some implementations, the first member may include an elongated member. The traveling member may include a collar and a pin at least partially disposed in the collar. The pin follows the track to allow automatic lateral moving of the shade. In some implementations, the roller shade may include a second member, which may include a tube. The second member may be coupled to the shade. The first member may be disposed at least partially in the second member. In some implementations, the second member may be coupled to the traveling member. The roller shade may include a third member that includes an opening. The second member may be coupled to the traveling member at least partially through the opening of the third member; and automatically laterally moving the shade may include allowing the second member to rotate and move laterally along the opening in the third tube.

In various implementations, a method of moving a shade of a roller shade may include adjusting a longitudinal position of a roller shade and automatically adjusting the lateral position of the shade when the longitudinal position of the roller shade is adjusted. Altering a longitudinal position of the shade may include moving an end of a shade along a plane normal to a length disposed between a first end and a second end of the roller shade.

Implementations may include one or more of the following features. Adjusting the vertical position of the shade may include moving a shade from an extended position to a retracted position. Automatically adjusting the lateral position of the shade may include automatically moving the shade from a second position of the shade to a first position of the shade. In some implementations, adjusting the vertical position of the shade may include allowing a second member of the roller shade to rotate. The second member may be coupled to the shade. In some implementations, automatically adjusting the lateral position of the shade may include allowing a receiving member of a travelling member to move along a track of the first member by rotating the second member. Allowing the receiving member to travel along the track may adjust a position of the receiving member along a length of the roller shade. Adjusting the position of the receiving member may adjust the position of a shade by adjusting the position of the second member along a length of the roller shade. Adjusting the vertical position of the shade may include extending the shade. Automatically adjusting the lateral position may include moving the shade from a first position to a second position.

The second position is closer to a second end of the roller shade than the first position, in some implementations.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 1G illustrates a cross-sectional view of an implementation of an example roller shade.

FIG. 1H illustrates an implementation of a portion of an example first member.

FIG. 1I illustrates an implementation of a portion of an example first member.

FIG. 1J illustrates an implementation of a portion of an example first member.

FIG. 1K illustrates a cross-sectional view of an implementation of an example travelling member.

FIG. 1L illustrates a cross-sectional view of an implementation of an example travelling member.

FIG. 1M illustrates a cross-sectional view of an implementation of an example travelling member.

FIG. 3A illustrates an implementation of an example roller shade.

FIG. 3B illustrates a cutaway view of the example roller shade 300, illustrated in FIG. 3A.

FIG. 3C illustrates an implementation of a portion of the example roller shade 300, illustrated in FIG. 3A.

FIG. 4B illustrates an implementation of the example roller shade illustrated in FIG. 4A.

FIG. 5B illustrates an implementation of a portion of the example roller shade illustrated in FIG. 5A.

FIG. 5C illustrates an implementation of a portion of the example roller shade illustrated in FIG. 5A.

Like reference symbols in the various drawings indicate like elements.

DETAILED DESCRIPTION

Roller shades may be utilized in a variety of applications (e.g., recreational vehicles, automobiles, boats, homes, and/or other applications) during daytime and/or nighttime applications. For example, shades may include solar shades to reduce the amount of light allowed to pass while including at least a portion of transparent and/or translucent material to allow viewing through the portion. In some implementations, the shades may include privacy shades that include at least a portion of opaque material.

In various implementations, roller shades may be used for, but are not limited to being used for, windows and/or doors. In some implementations, an area to be covered by an extended roller shade may include any shape or size. For example, an area to be covered may be a trapezoid or a rounded corner trapezoid. An area to be covered may be a square, a rectangle, a rounded corner square, a rounded corner rectangle, a circle, an oval, other regular polygons, and/or other irregular polygons.

Figure 1A:
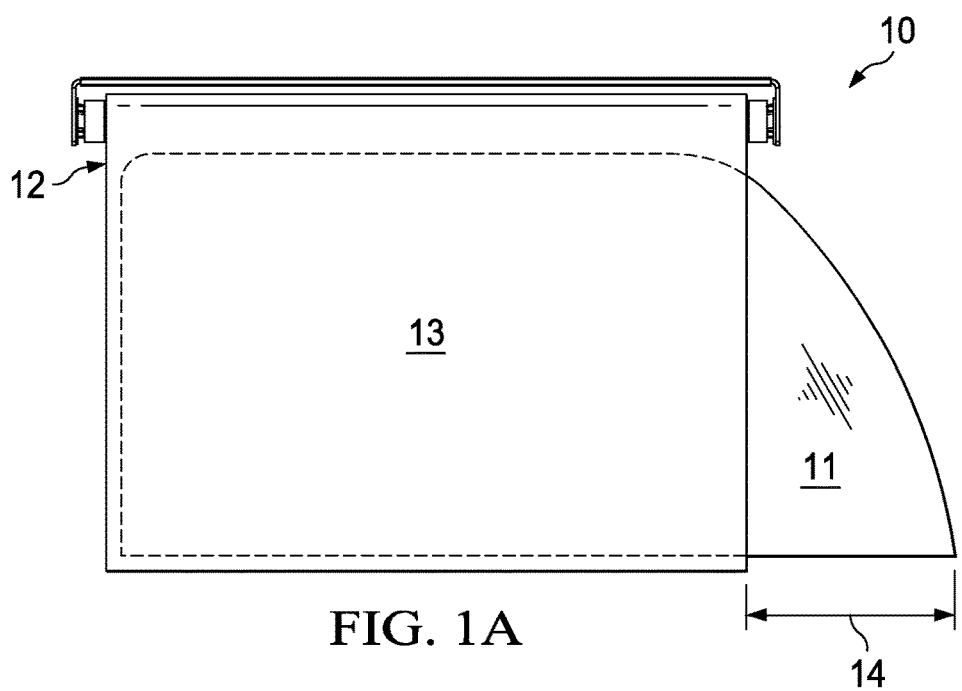
FIG. 1A illustrates an implementation of an example roller shade.

In some implementations, the area in which a frame may be mounted may not facilitate mounting of a uniform roller shade (e.g., a roller shade in which the shade is maintained in a horizontal plane and/or lateral movement is restricted). For example, when a uniform roller shade is utilized, a clearance may exist between the area to be covered and the shade. FIG. 1A illustrates an implementation of an example installation area 10 that includes an area to be covered 11. As illustrated, a uniform roller shade 12 may be mounted in an area to be covered 11. A clearance 14 may exist between the area to be covered and the extended shade 13 of the uniform roller shade 10.

Figure 1B:
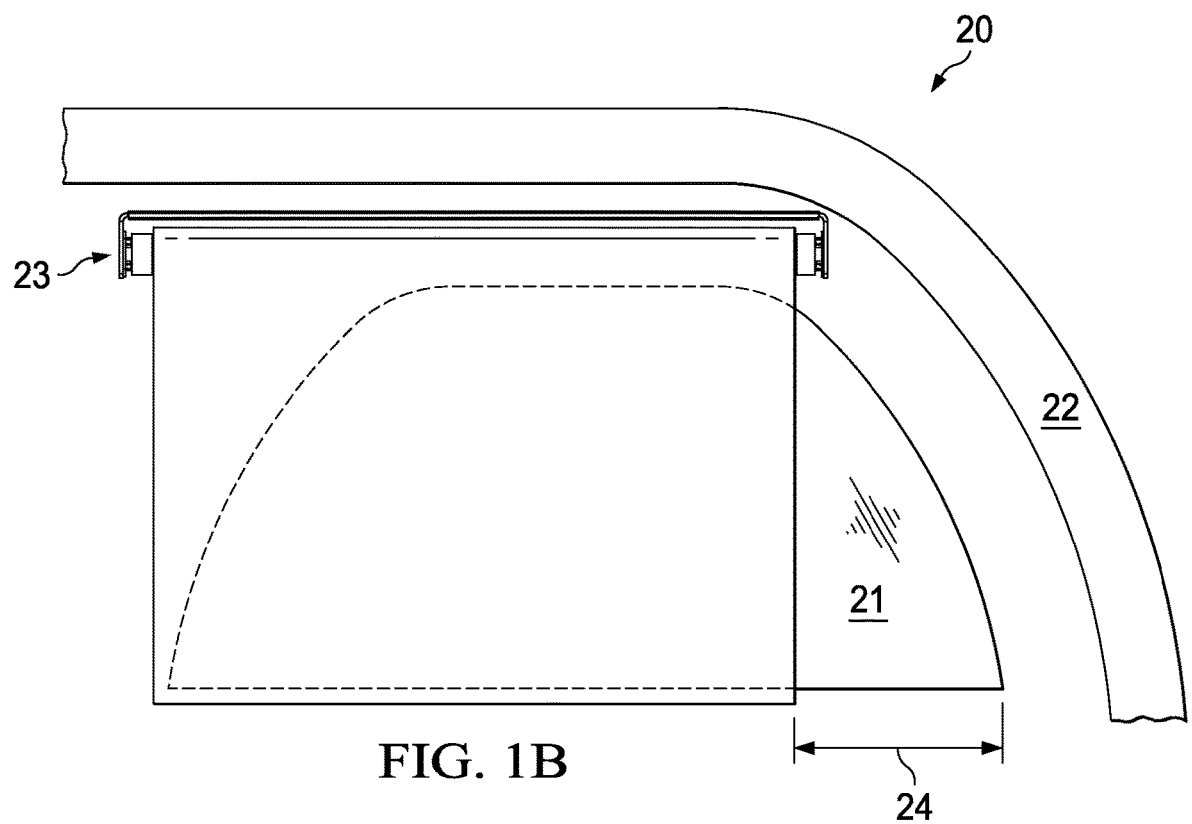
FIG. 1B illustrates an implementation of an example roller shade.

As illustrated in the implementation of the example installation area 20 of FIG. 1B, a mounting conditions may cause a clearance to exist between a shade of an installed uniform roller shade and the area to be covered. For example, proximate a front window 21 of a recreational vehicle, a window frame 22 may inhibit mounting of a roller shade 23 large enough to cover the window. Thus, a clearance 24 may exist between the opening of the window 21 and the shade 24 of the roller shade 23.

A roller shade may be utilized to allow a shade to be retracted and/or extended and repositioned laterally. For example, a shade of the roller shade may be rolled up and down and concurrently move the shade towards the left and/or right. Allowing the shade to move left or right may facilitate covering a variety of area shapes (e.g., windows) and/or facilitate mounting of the roller shade, in some implementations.

Lateral and/or longitudinal adjustment of a shade may be relative to the roller shade or portions thereof (e.g., relative to the first member). For example, lateral adjustment may be along an axis approximately parallel to the axis disposed along a length of at least a portion of the roller shade and/or portions thereof (e.g., the first member, second member, and/or third member). Longitudinal adjustment may be along an axis approximately perpendicular to the axis disposed along a length of at least a portion of the roller shade and/or portions thereof (e.g., the first member, second member, and/or third member).

Figure 1C:
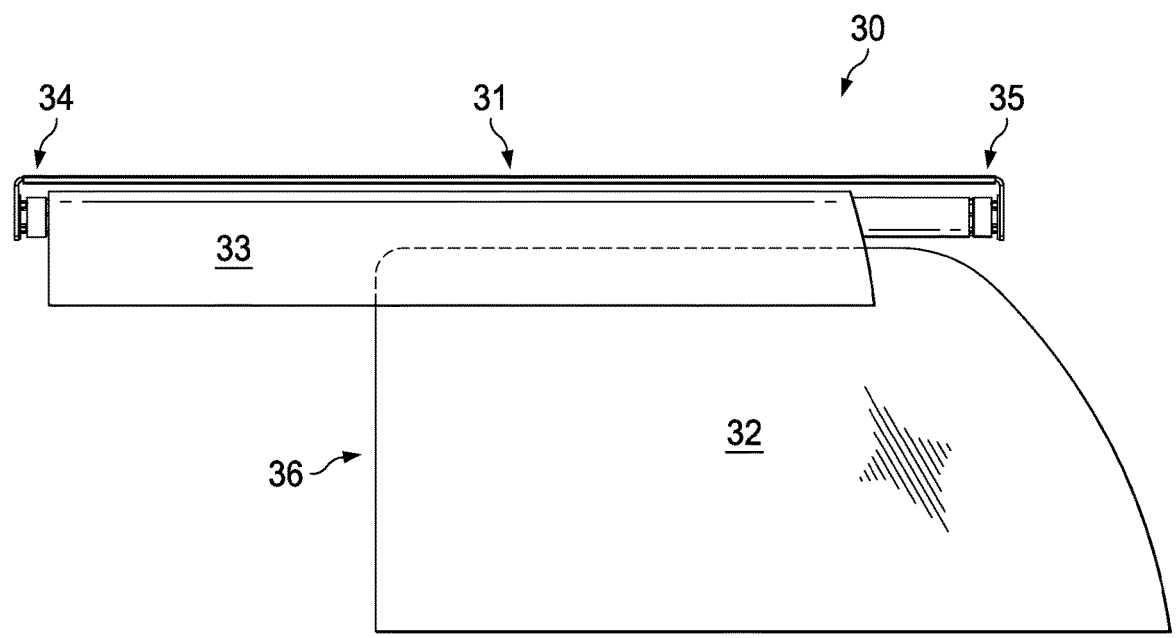
FIG. 1C illustrates an implementation of an example roller shade in which the shade is retracted.
Figure 1D:
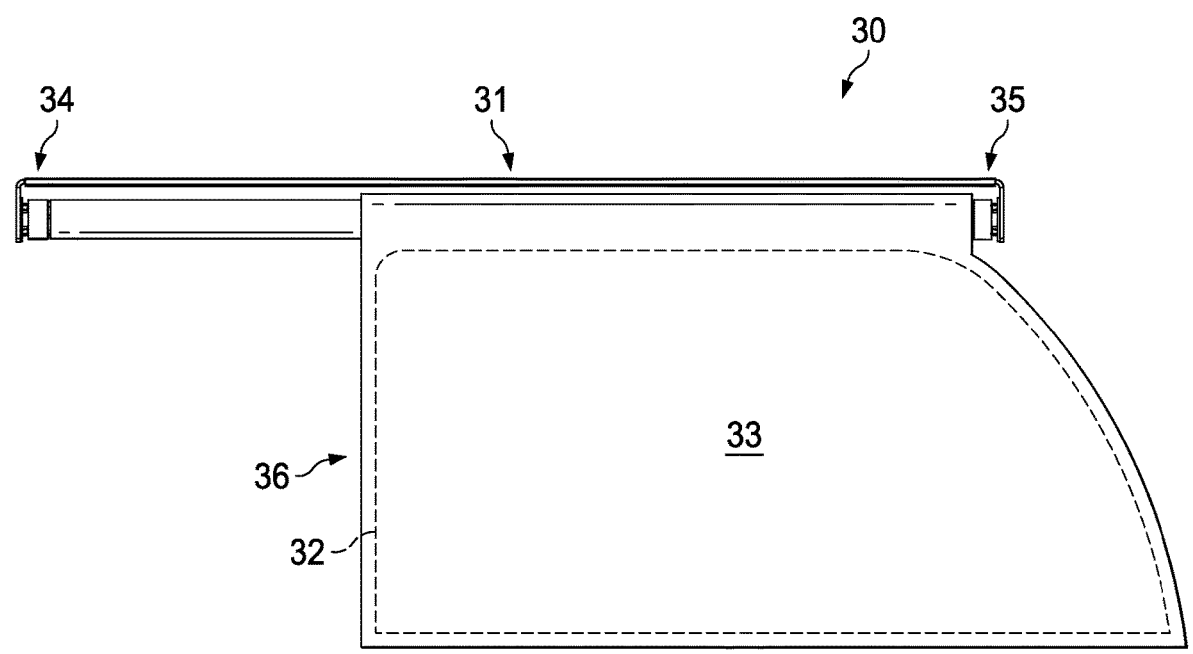
FIG. 1D illustrates an implementation of the example roller shade, illustrated in FIG. 1C, in which the shade is expanded.

FIG. 1C illustrates an implementation of an example installation 30 of a roller shade 31 that is retracted. FIG. 1D illustrates an implementation of the example installation 30, illustrated in FIG. 1C, of the example roller shade 31 that is expanded. The roller shade 31 is mounted (e.g., coupled) to an area proximate an area to be covered, such as a window 32. The roller shade 31 may include a shade 33. The roller shade may include a first end 34 and a second opposing end 35. The roller shade may have a length between the first end 34 and the second end 35. The roller shade may have a cross-sectional area (e.g., a width and height). The cross-sectional area of the roller shade and/or portions thereof may be approximately uniform and/or different along a length of the roller shade. In some implementations, one or more components of the roller shade may extend from a first end to the second end of the roller shade. One or more components of the roller shade may not extend from the first end to the second end of the roller shade, in some implementations.

As illustrated in FIG. 1C, when the shade 33 of the roller shade 31 is retracted, the window 32 may extend beyond the second end 35 of the roller shade. If a uniform roller shade is utilized, a clearance may exist between the window and the shade (e.g., as illustrated in FIG. 1A). As illustrated in FIG. 1D, when the shade 33 is extended, the shade is repositioned laterally.

In some implementations, when the shade 33 is retracted, the shade may be in a first position. As illustrated in FIG. 1C, the first position of the shade 33 may be proximate a first end 34 of the roller shade 31. In the first position, the first end 36 of the shade may be closer to the first end 34 than in the second position. As shade 33 is retracted, the shade moves towards the first end 34 of the roller shade 31.

When the shade 33 is extended, the shade may be in a second position. The second position of the shade 33 may be different than the first position of the shade. A first end 36 of the shade 33 may be closer to the second end 35 of the roller shade in the second position than in the first position. For example, when the first end of the shade is closer to the second end of the roller shade, the first end of the shade may be closer to the left side, right side, top side, and/or bottom side of the roller shade based on the orientation of the installation of the roller shade. As the shade is extended, the shade moves towards the second end 35 of the roller shade 31.

Figure 1E:
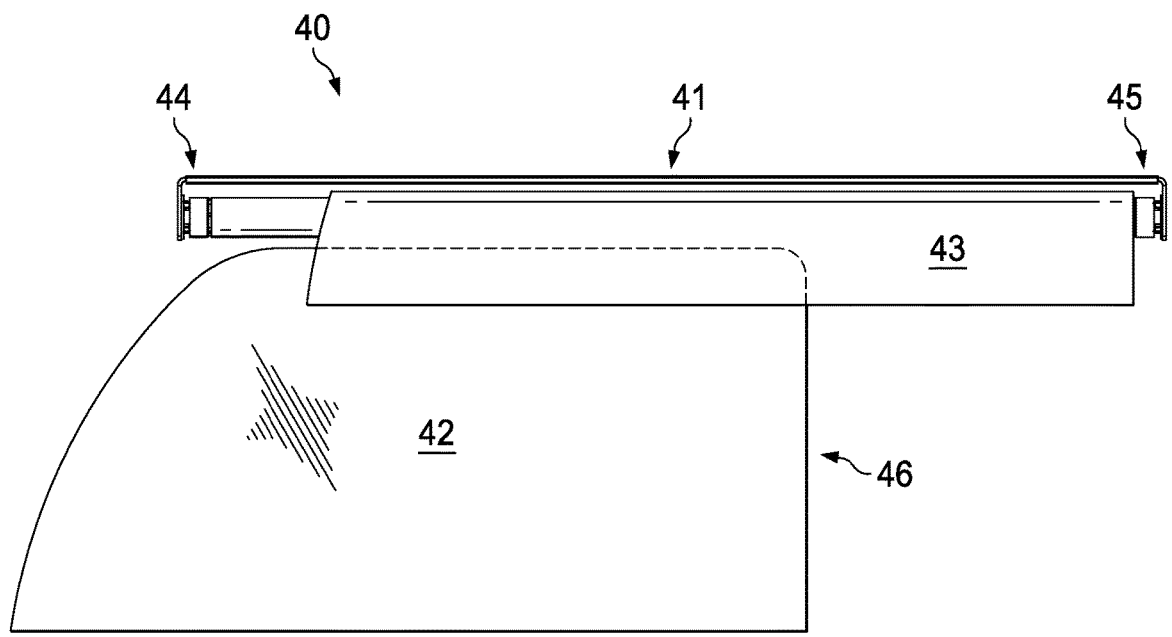
FIG. 1E illustrates an implementation of an example roller shade in which the shade is retracted.
Figure 1F:
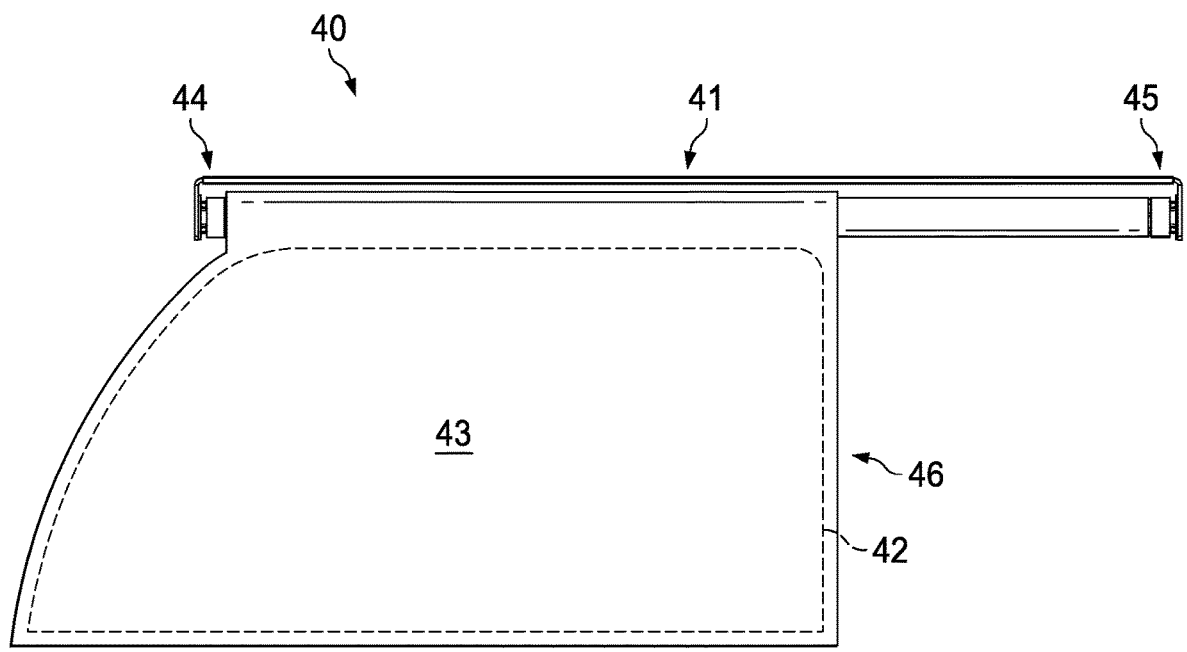
FIG. 1F illustrates an implementation of the example roller shade, illustrated in FIG. 1E, in which the shade is expanded.

The roller shade may be utilized in a variety of installations. The orientation of the roller shade may be based at least partially on the installation. For example, a roller shade may extend upwards (e.g., a portion of the shade may be secured with a coupling member to a location proximate the area to be covered). In some implementations, the shade of the roller shade may be displaced to the left. In some implementations, the shade of the roller shade may be displaced to the right. For example, FIG. 1E illustrates an implementation of an example installation 40 of a roller shade 41 that is retracted. FIG. 1F illustrates an implementation of the example installation 40, illustrated in FIG. 1E, of the example roller shade 41 that is expanded. As illustrated, the roller shade 41 is installed proximate an area to be covered, such as a window 42. When retracted, the shade 43 of the roller shade 41 is disposed proximate a second side 45 of the roller shade (e.g., as opposed to proximate a first side 44 of the roller shade, as illustrated in FIG. 1C). The window 42 extends beyond the first end of the roller shade. As illustrated in FIG. 1F, when the shade 43 is extended, the shade is laterally displaced As illustrated, the shade 43 may move from a first position, proximate the second end 45 of the roller shade, to a second position. In the second position, a side, such as an edge 46 of the shade 43, may be disposed closer to the first end 44 of the roller shade, than when the shade is in the first position.

To laterally adjust the position of the shade of the roller shade while concurrently and/or automatically adjusting the longitudinal position of the shade, the roller shade may include a roller shade movement device. The roller shade movement device may automatically adjust the lateral position of the shade when the shade is refracted and/or expanded.

FIG. 1G illustrates an implementation of a roller shade 50 with a roller shade movement device. As illustrated, the roller shade 50 includes a first member 51, a second member 52, and a third member 53. The first member 51, second member 52, and/or third member 53 may be elongated members. The first member 51, second member 52, and/or third member 53 may include an opening (e.g., a lumen) that passes through at least one of the ends of the member. The first member 51, second member, 52, and/or third member 53 may be a conduit, such as a tube. The first member 51, second member, 52, and/or third member 53 may each have similar or different cross-sectional areas (e.g., including a width and a height of a member) and/or lengths. The first member 51 may be at least partially disposed in the second member 52 and/or the third member 53. The second member 52 may be at least partially disposed in the third member 53.

FIG. 1H illustrates an implementation of a portion of an example first member 60. FIG. 1G illustrates an implementation of a portion of an example first member 63. FIG. 1I illustrates an implementation of a portion of an example first member 64. The first member 60, 63, 64 may have a body 61. The body 61 may include a tube, in some implementations. The first member may include a length and a cross-sectional area (e.g., including a width and a height).

The first member 60, 63, 64 may include a track 62. The track may extend along at least a portion of the length of the roller shade and/or first member. The track 62 may provide a guide for movement along a length of the body 61 of the first member. For example, the track 62 may include guide (s), such as recess(es), protrusion(s), wire(s), and/or other appropriate tracks to guide movement. For example, the track 62 may include a groove. The track 62 may include a series of recess(es) and/or protrusion(s) formed in the body 61. In some implementations, the track may be coupled to at least a portion of the body. For example, the track may include a wire or other member that at least partially circumscribes the body of the first member. The guide may include any appropriate member that controls the movement of a travelling member at least partially disposed in and/or coupled to the track. In some implementations, the guide may be at least partially disposed in at least a portion of the travelling member and movement of the travelling member may be at last partially restricted by the guide (e.g., the travelling member may have to follow a path provided by the guide).

In some implementations, the track may include portions, which include similar or dissimilar materials. For example, a portion of a track may include a plastic and a portion of the guide may include a metal. In some implementations, the track and the guide may include similar materials.

The track 62 may be coupled to and/or formed in at least a portion of the body 61 of the first member, in some implementations. As illustrated in FIG. 1H, the track 62 include a portion that is disposed helically about at least a portion of the body 61 of the first member 60. As illustrated in FIG. 1I, the track 62 may include an approximately straight portion (e.g., approximately parallel to an axis disposed along a length of the first member 63). As illustrated in FIG. 1J, the track 62 may include a portion that at least partially circumscribes the body 61 of the first member 64 (e.g., a protrusion, such as a wire, may extend across at least a portion of an outer surface of the first member). The track may circumscribe the body 61 more than one time, in some implementations. For example, at least a portion of the track may include a spiral track.

The roller shade movement device of the roller shade may include a travelling member. The travelling member may couple with the track of the first member to allow movement along the track. For example, the travelling member may be frictionally fit in at least a portion of the track such that movement along the track by the travelling member may be allowed and other movement (e.g., movement out of the track) may be at least partially restricted. In some implementations, a portion of the travelling member may include a dovetailed member such that movement out of the track may be restricted while allowing movement along a length of the track. The travelling member may be received by and/or receive at least a portion of the track of the first member. For example, the travelling member may include a receiving member such as a protrusion and/or recess that is received by and/or receives a protrusion and/or recess of the track or portion thereof. The travelling member may include an opening through which at least a portion of the track (e.g., a wire guide) is disposed. In some implementations, the travelling member may include a collar and/or a receiving member (e.g., pin or other fastener, protrusion(s), and/or recess(es)).

Figure 1N:
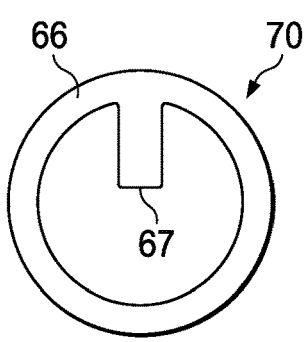
FIG. 1N illustrates a cross-sectional view of an implementation of an example travelling member.
Figure 1O:
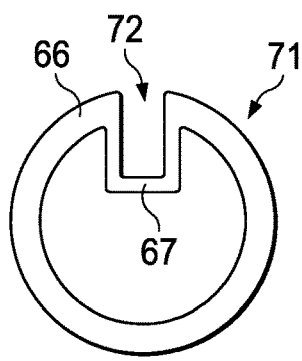
FIG. 1O illustrates a cross-sectional view of an implementation of an example travelling member.

FIG. 1K illustrates an implementation of an example travelling member 65. FIG. 1L illustrates an implementation of an example travelling member 68. FIG. 1M illustrates an implementation of an example travelling member 69. FIG. 1N illustrates an implementation of an example travelling member 70. FIG. 1O illustrates an implementation of an example travelling member 71. The travelling member 65, 68, 69, 70, 71 may include a body 66 and a receiving member 67. The body 66 may include any appropriate shape. For example, the body 66 may include a conduit as illustrated in FIGS. 1N and 1O. The receiving member 67 may be selected to couple with (e.g., be received by, receive, and/or attach) one or more of the guides of a track of a first member.

The body of the travelling member may move as the receiving member moves along a portion of the track. When the track at least partially circumscribes the body of the first member, the travelling member may rotate as the receiving member moves along the track. For example, when the body of the travelling member includes a conduit, such as a collar, the collar may rotate as the receiving member moves along at least a portion of the track.

As illustrated in FIG. 1K, the receiving member 67 may include a protrusion. The protrusion may couple with a recess of a track. During lateral repositioning of the shade, the protrusion may move along at least a portion of a length of a track while the protrusion is disposed at least partially in the recess of the track.

As illustrated in FIG. 1L, the receiving member 67 may include an opening. The opening may couple with a wire or other guide of a track. For example, a wire of a track may be disposed in an opening of the travelling member. During lateral repositioning of the shade, the travelling member may move along at least a portion of a length of a track while the wire is disposed at least partially in the opening of the travelling member.

The receiving member may include more than one protrusion and/or recess, in some implementations. As illustrated in FIG. 1M, the receiving member 67 may include more than one protrusion and a recess disposed between the protrusions. The protrusions may at least partially surround at least a portion of the track (e.g., a protrusion of the track). The recess of the receiving member may at least partially receive the protrusion of the track. During lateral repositioning of the shade, the protrusions and recess may move along at least a portion of a length of a track while the protrusion of the track is disposed at least partially in the recess of the receiving member.

As illustrated in FIG. 1N, the receiving member 67 may include a protrusion. The body 66 of the travelling member may be a conduit, such as a collar, that at least partially surrounds a portion of the first member. The protrusion of the travelling member may couple with a recess of a track. During lateral repositioning of the shade, the protrusion may move along at least a portion of a length of a track while the protrusion is disposed at least partially in the recess of the track.

As illustrated in FIG. 1O, the receiving member 67 may include a protrusion and a recess. The recess may include a first coupling member. For example, a second coupling member, such as a fastener, may be disposed at least partially in the recess and couple with the first coupling member (e.g., threads of the first coupling member). The second coupling member (e.g., fastener) may couple the traveling member to other portions of the roller shade, such as the second member and/or third member.

Figure 1P:
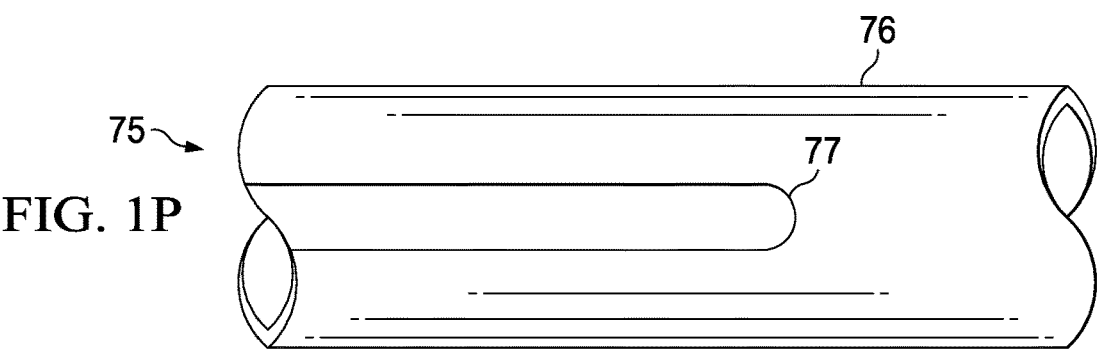
FIG. 1P illustrates an implementation of a portion of an example second member.

FIG. 1P illustrates an implementation of a second member 75. The second member 75 may at least partially surround the first member and/or at least partially surround the travelling member. The second member 75 may include a body 76 and a recess 77. The recess 77 may extend at least partially along a length of the body 76. The recess 77 may extend to an end of the body 76 and/or be an opening in the body 76 of the second member 75. The second member 75 may be coupled to the travelling member such that as the receiving member of the travelling member moves along a track, the second member may rotate. The recess 77 may receive a second coupling member and/or at least a portion of the travelling member to couple the second member 75 to at least a portion of the travelling member.

Figure 1Q:
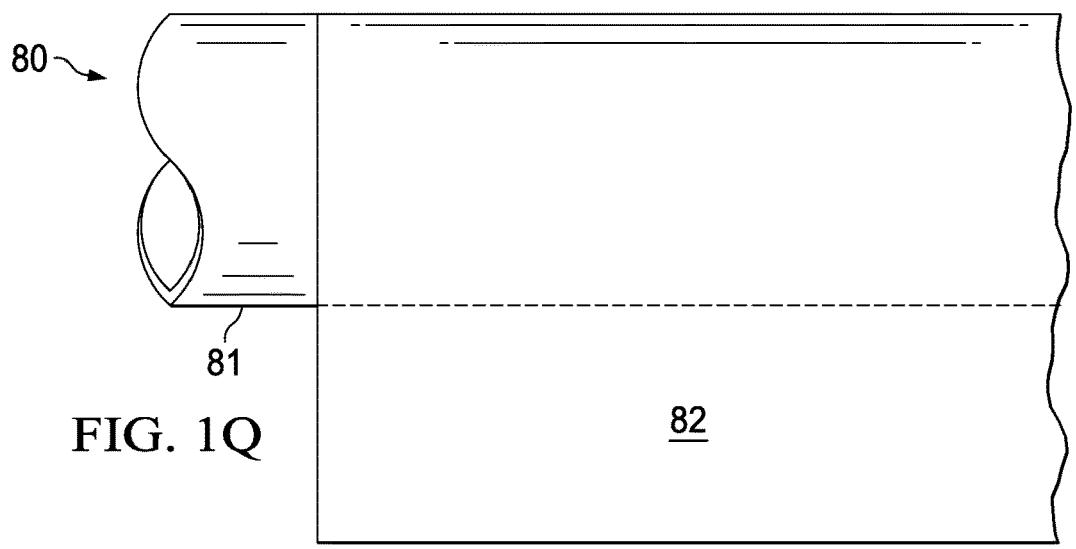
FIG. 1Q illustrates an implementation of a portion of an example third member.
Figure 1R:
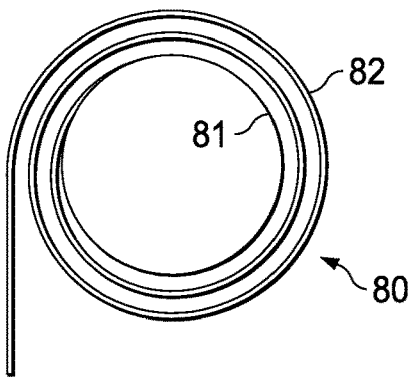
FIG. 1R illustrates a cross-sectional view of an implementation of the example third member illustrated in FIG. 1Q.

FIG. 1Q illustrates an implementation of an example third member 80. FIG. 1R illustrates a side view of an example third member 80. The third member may include a coupling member to which a shade 82 is coupled to the third member 80. In some implementations, the shade 82 may be coupled to the body 81 of the third member. For example, the shade 82 may be bonded to the body of the third member. As illustrated in FIG. 1R, when the shade 82 is refracted, the at least a portion of the shade 82 is wrapped around the body 81 of the third member 80.

The third member may be coupled to the travelling member and/or the second member. For example, the third member may include a coupling member adapted to couple with the second coupling member of the travelling member.

During use, the third member may rotate as the shade is extended and/or retracted. For example, since the shade may be at least partially wrapped around the shade when the shade is retracted, when the shade is to be extended, the shade may be unrolled as the third member rotates. When the shade is to be retracted, the shade may be rewrapped (e.g., rerolled) around the third member, as the third member rotates. As the third member rotates, since the third member is coupled to the travelling member and/or the second member, the travelling member and/or the second member may move. For example, the rotation of the third member may cause the travelling member to rotate about a body of the first member along the track of the first member. The rotation of the third member may cause the second member to rotate which may compress a spring of a positioner.

The positioner of the roller shade may assist retraction of the shade when activated and/or maintain an extended position of the roller shade. For example, the positioner may include a spring that compresses when the shade is extended. When the positioner is activated (e.g., by pulling the extended shade), the spring may expand and cause rotation of the third member to rewrap the shade (e.g., by rotating the second member which then rotates the third member to which the second member is coupled).

Figure 2A:
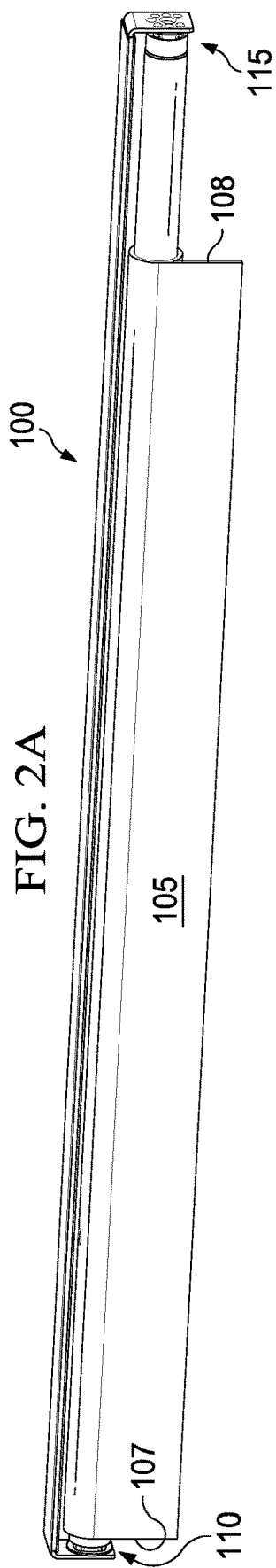
FIG. 2A illustrates an implementation of an example retracted roller shade, in which the shade is retracted.

FIG. 2A illustrates an implementation of an example roller shade 200. The roller shade may include a shade 205. The shade may include a first end 207 and a second opposing end 208. The roller shade 200 includes a first end 210 and a second opposing end 215.

As illustrated, the shade 205 of the roller shade 200 may be retracted. When the shade 205 of the roller shade 200 is retracted, it may be proximate a first end. As illustrated, when the shade 205 is retracted, an end 207 of the shade 205 may be disposed on the left side of the roller shade.

Figure 2C:
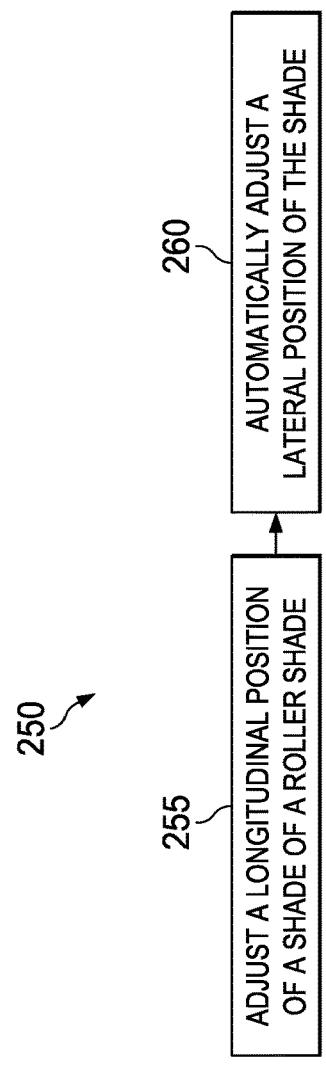
FIG. 2C illustrates an implementation of an example process for adjusting a roller shade.
Figure 2B:
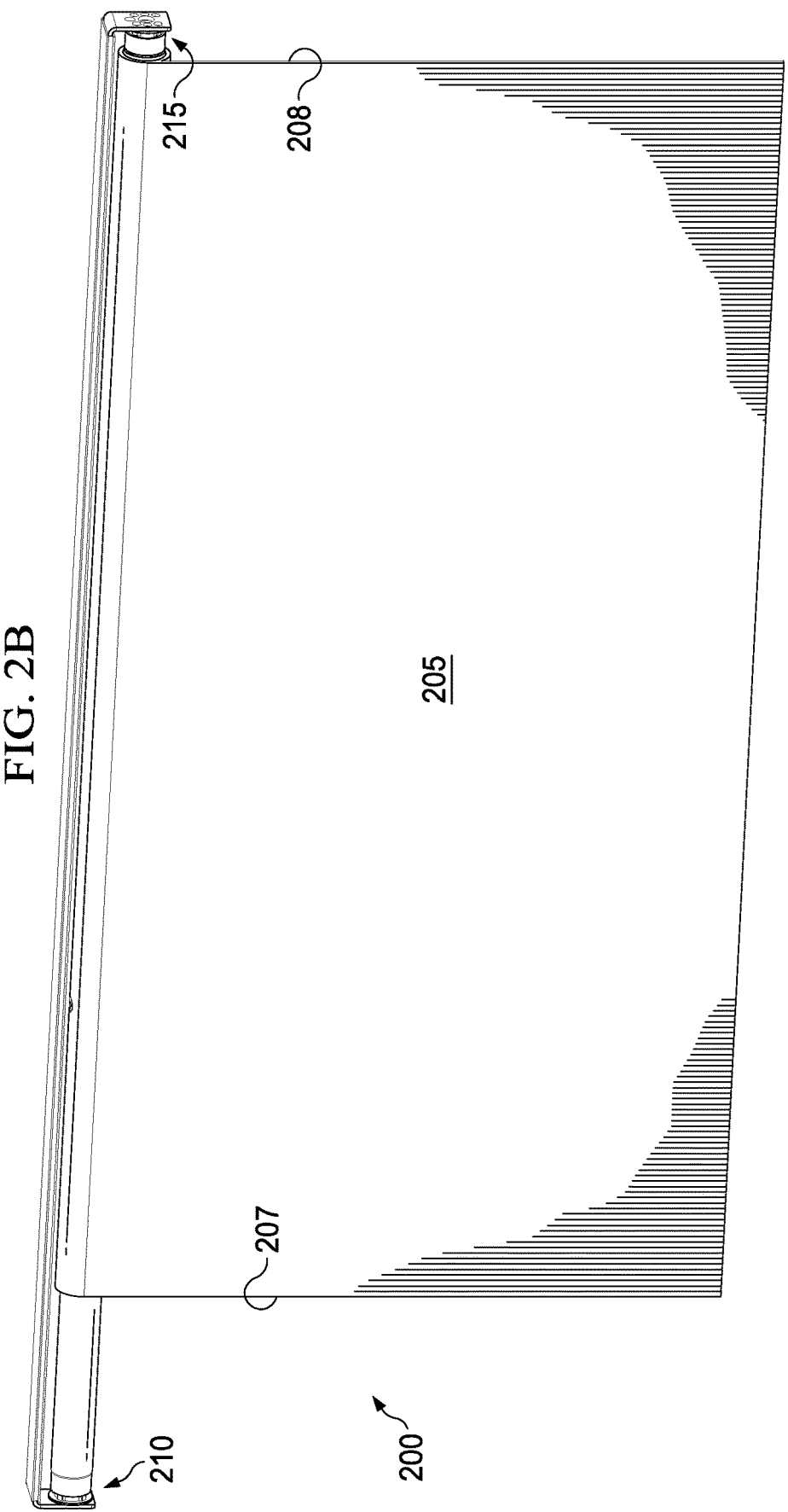
FIG. 2B illustrates an implementation of an example extended roller shade, in which the shade is expanded.

FIG. 2B illustrates an implementation of an example roller shade 200. The roller shade 200 may include a shade 205. The shade 205 may include a first end 207 and a second opposing end 208. The roller shade 200 may include a first end 210 and a second opposing end 215. As illustrated, the shade 205 of the roller shade 200 may be extended. When the shade 205 is extended, the shade may travel towards the second end 215 of the roller shade 200. As illustrated, a second end 208 of the shade 205 may be proximate the second end 215 of the roller shade 200. For example, as illustrated, when the shade 205 is extended the shade may travel towards the right.

FIG. 2C illustrates an example process 250 for adjusting a roller shade. The longitudinal position of a shade of a roller shade may be adjusted (operation 255). For example, the roller shade may be retracted and/or extended. A shade of the roller shade may be wrapped at least partially about third member. The third member may be a conduit, such as a tube. Extension of a shade may include unwrapping at least a portion of the shade that is wrapped around the third member. For example, the shade may be pulled down and a length of the shade that is used to cover an area to be covered may be increased. Extending the shade may cause a spring coupled to the third member of the roller shade (e.g., to which the shade is coupled) to be compressed. Retracting the shade may include wrapping at least a portion of the shade around the third member. For example, the shade may be pulled down to activate a spring that exerts a force on the third member. The force exerted on the third member may cause the third member to rotate and wrap at least a portion of the shade about itself. In some implementations, a user may exert a force upon a shade or portion thereof (e.g., a loop, tassels, and/or chain) to extend and/or retract a shade.

The lateral position of the shade may be automatically adjusted (operation 260). For example, when the shade is extended and/or retracted, the shade may travel towards the second end of the roller shade. For example, when the shade is extended the shade may travel towards the right. The shade may be laterally displaced by the travelling member of the roller shade moving along a track in a first member of the roller shade.

Process 250 may be implemented by various systems, such as roller shade 10, 20, 30, 40, 100, 200, and/or other systems. In addition, various operations may be added, deleted, and/or modified. In some implementations, the described operations of the processes may be performed in combination with other processes and/or operations of processes. For example, the extension and/or retraction of the shade may be motorized and/or performed with the assistance of another device (e.g., motor, extension hook, etc.).

Figure 3D:
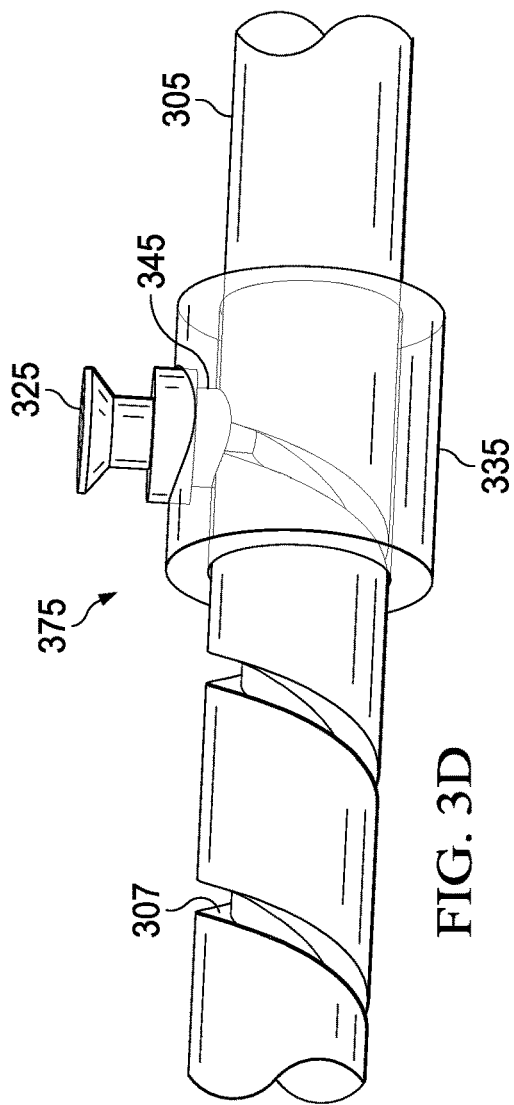
FIG. 3D illustrates an implementation of a portion of the example roller shade 300, illustrated in FIG. 3A.

FIG. 3A illustrates an implementation of an example roller shade 300. FIG. 3B illustrates an implementation of a cutaway view of the example roller shade 300 of FIG. 3A. FIG. 3C illustrates a first portion 350 of the roller shade 300. FIG. 3C illustrates a second portion 375 of the roller shade movement device of the roller shade 300.

As illustrated, the roller shade 300 includes a first member 305, a second member 310, and a third member 315. The first member 305, the second member 310, and/or the third member 315 may include tube(s). The first member 205 may be disposed at least partially in the second member 210 and the third member 215. The third member 315 may be disposed at least partially in the second member 310.

The first member 305 may include a track. The track may include a groove 307 in the first member 305, as illustrated. The track may be helix shaped.

The second member 310 may include an opening 320 to receive a fastener, such as a pin 325 (e.g., screw). The pin 325 may couple the second member 310 to the third member 315. The third member 315 may include a recess, such as a cutout 330. The pin 325 may be at least partially disposed in the opening 320 of the second member 310 and the cutout 330 of the third member.

The roller shade 300 may include roller shade movement device that includes a traveling member 335. The roller shade movement device may allow the shade of the roller shade to be extended and move laterally concurrently. The traveling member may include a collar 340 and a fastener, such as pin 325. The collar 340 may include an opening 345 to receive the pin 325. The pin 325 may follow the groove 307 of the first member 305 when the shade of the roller shade is rotated (e.g., when extending and/or retracting the shade). The collar 340 may follow the groove 307 in the first member 305. The collar 340 may be coupled (e.g., secured) to the second member 310, as illustrated in FIG. 3C.

As the shade is retracted (e.g., pulled down), the second member 310 may extend the fabric, as illustrated in FIGS. 1 and 2. The rotation of the second member 310 may cause third member 315 to rotate. Rotation of the third member 315 may cause the second member 310 to move to laterally reposition the extended shade. As illustrated in FIG. 2, laterally repositioning the extended shade may cause the shade to move towards a second end of the roller shade.

Figure 4A:
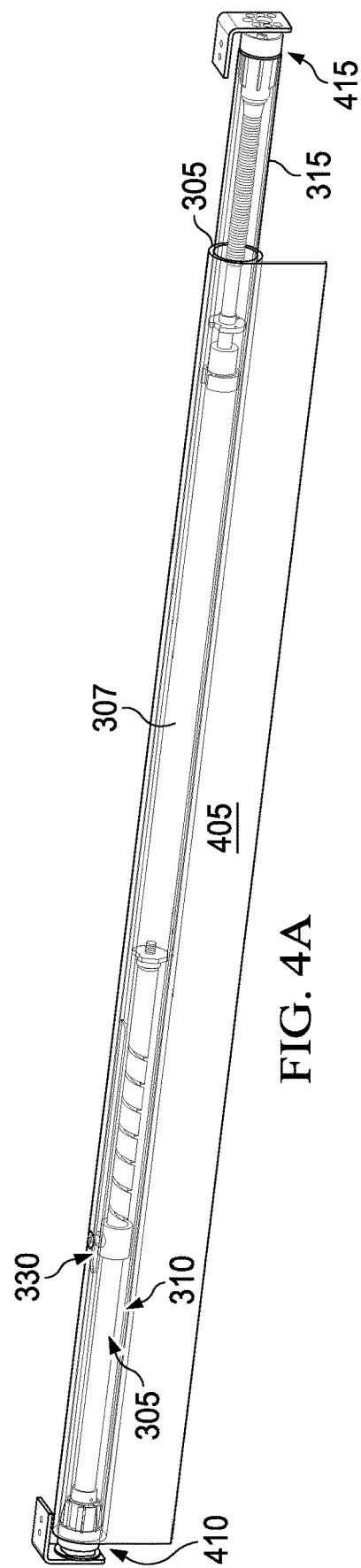
FIG. 4A illustrates an implementation of an example roller shade.

FIG. 4A illustrates an implementation of an example roller shade 400. FIG. 4B illustrates an implementation of the example roller shade 400, illustrated in FIG. 4A.

The roller shade 400 may include a first member 305, second member 310, third member 315, and roller shade movement device. The roller shade movement device may allow the shade 405 of the roller shade to rotate and move laterally concurrently. The roller shade movement device may include a track (e.g., groove 307) and a traveling member 380. The traveling member 380 may include a pin 325.

The shade 405 may be coupled to the second member 310. As illustrated, the roller shade 400 may be retracted (e.g., FIG. 4A) and/or extended (e.g., FIG. 4B). When the shade 405 is retracted, the shade may be disposed proximate a first end 410 of the roller shade 400. When the shade 405 is extended, the shade may move towards an opposing second end 415 of the roller shade 400.

Extending the material of the shade 405 (e.g., pulling the shade from the retracted position) may cause the second member 310 to rotate. When the second member 310 rotates, the shade 405 may be extended (e.g., since the shade is coupled to the second member, as illustrated). The pin 325 of the roller shade movement device may be coupled to the second member 310 and may be in the groove 307 (e.g., a stationary helical groove) of the first member 305. As the second member 310 rotates, the pin 325 in the groove 307 of the first member 305 causes the second member 310 to move laterally (e.g., towards a second end of the roller shade) by following the cutout 330 in the third tube 315 and guided by the collar 340.

Figure 5A:
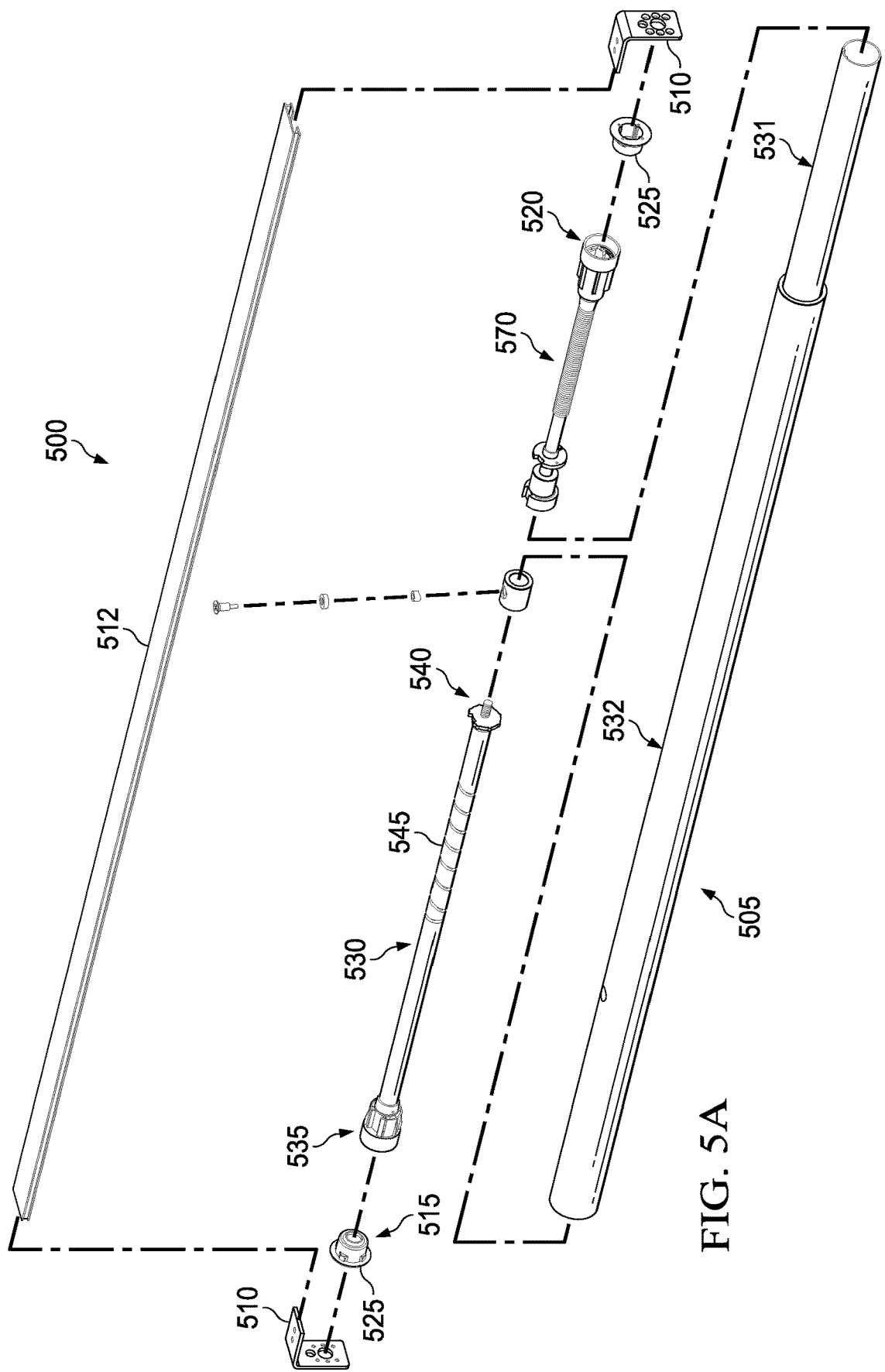
FIG. 5A illustrates an implementation of an example roller shade.

FIG. 5A illustrates an exploded view of an implementation of an example roller shade 500. FIG. 5B illustrates an exploded view of an implementation of a portion 550 of the example roller shade 500, illustrated in FIG. 5A. FIG. 5B illustrates an exploded view of an implementation of a portion 570 of the example roller shade 500, illustrated in FIG. 5A. As illustrated, the roller shade 500 may include a body 505 that couples to a mounting device. The mounting device may include one or more brackets 510, which may be coupled to an end of the body 505 of the roller shade 500. The brackets 510 may be connected to each other using a connection member 512 (e.g., planar, L-shaped, and/or any other appropriate shade). The brackets 510 and the connection member 512 may form a frame of the mounting device. The brackets 510 may include openings through which at least a portion of a coupling member (e.g., a fastener such as a screw) may be disposed to couple the bracket 510 to an end of the roller shade.

The body 505 of the roller shade may include a first end 515 and a second end 520. A coupling member 525 may be utilized to mount an end of the body of the roller shade to a bracket. The coupling member 525 may be disposed at least partially in an opening proximate an end of the body 505 of the roller shade. For example, the coupling member 525 may be adapted such that a portion may be disposed and coupled (e.g., frictionally fit) to a portion of a lumen of a portion of the body 505.

As illustrated the body 505 may include a first member 530, a second member 531, and a third member 532. As illustrated, the first member 530, the second member 535, and the third member 540 may include tubes. The first member 530 may be disposed at least partially in a opening of the third member. The first member 530 may include a first end 535 and a second end 540. The coupling member 525 may be disposed at least partially in the first end 535 of the first member 530. The body 505 may be coupled to the bracket 510 of the mounting device proximate the first end 535 of the first member 530.

The first member 530 may include a track 545. As illustrated, the track may include a receiving member such as a recess. The receiving member may be formed along at least a portion of a length of the first member 530. The receiving member may circumscribe the body of the first member 530, as illustrated.

The roller shade 500 may include a travelling member 550. As illustrated, the travelling member 550 may include a body 555 and a coupling member 560. The body 555 of the travelling member 550 may be a conduit. The first member may be at least partially disposed in a lumen of the conduit. The coupling member 560 may include a recess 565 to receive the coupling member 560. A washer 568 may be utilized in coupling the coupling member 560 to the travelling member, in some implementation. The coupling member 560 may extend through an opening 565 of the body 555 of the travelling member. Thus, the coupling member 560 may act as the receiving member and move along the track 545.

The second member 531 may be disposed at least partially in the lumen of the third member 532. In some implementations, the travelling member 550, the second member 531, and/or the third member 532 may be coupled. For example, the coupling member 560 may couple the travelling member to the second member 531 and/or the third member 532.

As illustrated, the roller shade 500 may include a positioner 570. The positioner 570 may include a first end 575 and a second opposing end 580. A recess of the second end 580 of the positioner may receive at least a portion of the coupling member 525 to at least partially couple the body 505 of the roller shade to the mounting device. The positioner may include a spring 585. When the positioner is activated, the spring may be compressed or allowed to expand. The spring may assist in vertical positioning of the shade of the roller shade 500. For example, the spring may maintain a position of the shade (e.g., extended and/or retracted). The spring may assist in refraction of the shade, in some implementations. When the shade is extended, the spring 585 of the positioner 570 may be compressed. Thus, when the shade is refracted, the positioner may be activated and the spring may be allowed to expand. Expansion of the spring may cause at least partial rotation of the third member to which the shade is attached, which may at least partially reroll the shade about the third member.

Figure 6:
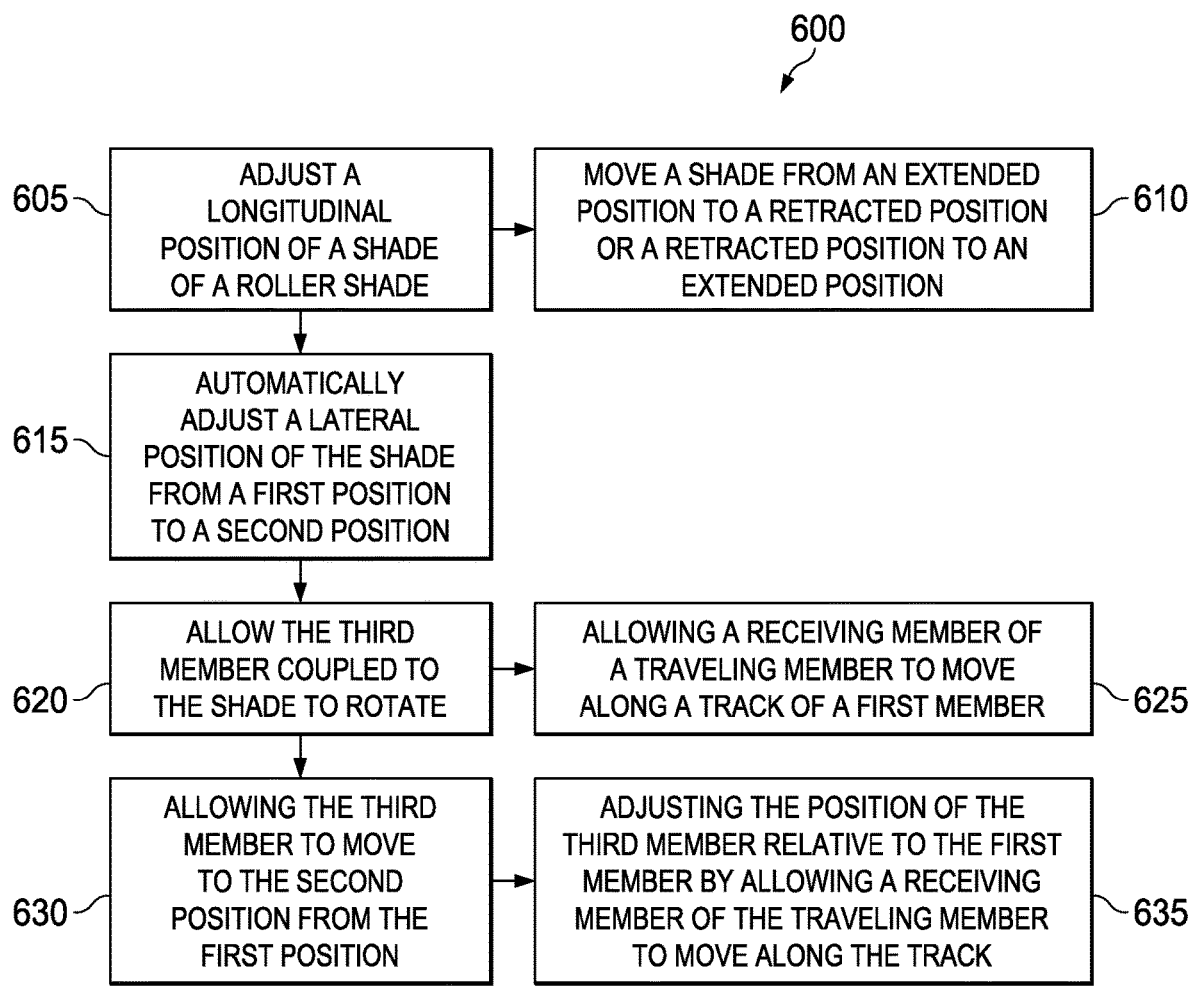
FIG. 6 illustrates an implementation of an example process for adjusting a position of a shade.

FIG. 6 illustrates an implementation of an example process 600 for adjusting a position of a roller shade. The longitudinal position of a shade of a roller shade may be adjusted (operation 605). For example, the shade of the roller shade may be extended or retracted. To extend a shade, a user may pull downward on the shade, in some implementations. To retract the shade, the user may pull down on an extended shade to activate a retraction aid such as a positioner, which may facilitate refraction of the shade, in some implementations. Thus, to adjust a longitudinal position of the shade, the shade may be moved from an extended position to a retracted position or from a retracted position to an extended position (operation 610). When the shade is extended and/or retracted, the third member of the roller shade may be rotated. For example, the shade may be coupled (e.g., proximate an edge of the shade) to at least a portion of the third member and may be wrapped at least partially around the third member when retracted and/or expanded. Thus, as the shade is wrapped and/or unwrapped from the around the third member, the third member may be rotated (e.g., rather than moving the shade around the body of the third member, the third member may be allowed to rotate while the shade is extended downwards).

A lateral position of the shade may be automatically adjusted from a first position to a second position (operation 615). The second position may be closer to a second end of the roller shade than the first position. For example, a first side of the shade (e.g., an edge disposed between the side of the shade coupled to the third member and the side of the shade opposing to the side of the shade coupled to the third member) may be moved from a first position to a second position, where the second position disposes the first side of the shade closer to the second end of the roller shade than the first position. The second end may be disposed to a right, left, top, and/or bottom relative to an opposing first end of the body (e.g., based on an roller shade installation orientation).

Automatic and/or concurrent adjustment of the lateral position of the shade with the longitudinal adjustment of the same shade may be activated by the rotation of the third member. Thus, to allow automatic adjustment of the lateral position of the shade, a third member, which is coupled to the shade, may be allowed to rotate (operation 620). Since the shade is coupled to the third member, extension and/or retraction of the shade may cause rotation of the third member.

A receiving member of a travelling member may be allowed to move along a track of a first member (operation 625). The third member may be coupled to the travelling member. Thus, when the third member is allowed to rotate, the travelling member may be moved by the rotation of the third member. The travelling member may include a receiving member, which is coupled (e.g., received by, receives, and/or movably affixed) to the track of the first member. The movement of the receiving member of the travelling member may be restricted to movement along the track (e.g., by friction, by receiving a portion of the track in the receiving member, and/or by receiving a portion of the receiving member in a portion of the track). Thus, when the third member is rotated (e.g., by allowing the shade to be extended and/or retracted), the travelling member moves along the track of the first member.

The third member may be allowed to move to the second position from the first position (operation 630). The third member may be coupled to the roller shade such that the position of the third member relative to an end of the roller shade may be adjusted. Thus, the lateral position of the third member, and thus the shade, may be adjusted. For example, the third member may be disposed about a tube (e.g., first member and/or second member) of the roller shade but may be able to move along a length of the tube.

The position of the third member relative to the first member may be adjusted by allowing the receiving member of the travelling member to move along the track (operation 635). As the travelling member moves along the track of the first member, a position of a third member relative to the first member may be laterally adjusted (e.g., since the third member moves along a length of the first member), since the travelling member and the third member are coupled. Thus, the third member may be allowed to move from a first position to a second position. The first position may be closer to first end of the roller shade than the second position.

Process 600 may be implemented by various systems, such as roller shade 10, 20, 30, 40, 50, 60, 63, 64, 65, 68, 69, 70, 71, 75, 80, 100, 200, 300, 400, 500, and/or other systems. In addition, various operations may be added, deleted, and/or modified. In some implementations, the described operations of the processes may be performed in combination with other processes and/or operations of processes, such as process 600 or portions thereof. For example, the roller shade may include a second member. The first member may be disposed at least partially in the second member and/or the second member may be disposed at least partially in the third member. The second member may be coupled to the travelling member and/or the third member. For example, a recess of the second member may be disposed between the third member and the travelling member and a fastener may couple the second member to the third member and/or the travelling member. Thus, when the third member is rotated (e.g., by extending and/or retracting the shade), the second member may be rotated. The second member may be coupled to the positioner. For example, an end of the positioner may be disposed in a lumen of the second member and/or coupled proximate an end of the second member. Thus, rotation of the second member may activate the positioner. When the positioner is activated, the spring of the positioner may be allowed to expand and/or compressed. For example, when the shade is extended and the third member causes the second member to rotate, the spring of the positioner may be compressed. To facilitate retraction of the shade, the positioner may be activated (e.g., by pulling the shade downwards, inwards, and/or outwards) and the spring may be allowed to expand. Expansion of the spring may cause the second member to rotate. Rotation of the second member may cause the travelling member to move and the third member to move (e.g., since the second member may be coupled to the travelling member and the third member). Movement of the travelling member, by the rotation of the second member, may cause the receiving member of the travelling member to move along the track of the first member. By moving along the track of the first member, the shade may laterally adjusted from the second position to the first position (e.g., where the first position is closer to a first end than the second position). For example, the third member may be laterally moved along the track by the movement of the travelling member along the track. Thus a shade attached to the third member may be moved laterally. The rotation of the second member by the spring of the positioner may also cause rotation of the third member. When the third member is rotated, the shade may be extended and/or retracted and thus the longitudinal position of the shade may be adjusted. Thus, the lateral position of the shade and the longitudinal position of the shade may be adjusted concurrently.

Although the first member, second member, and/or third member have been described as elongated members and/or tubes, the first member, second member, and/or third member may include a member of any appropriate cross-sectional shape and/or length. The shape of the first member, second member, and/or third member may vary across at least a portion of the length, in some implementations. For example, the first member, second member, and/or third member may include a c-shaped cross-sectional shape and a length. The first member, second member, and/or third member may include a rectangular cross-sectional shape, a length, and a lumen extending along the length and through the body of the member.

In some implementations, extension of the shade of the roller shade may include partial extension of the shade.

Although directions have been described with relation to sides and/or movement, the roller shade may be oriented in any appropriate manner. For example, the roller shade may be disposed horizontally, vertically, and/or at an angle. The direction in which an action occurs may be based on the installation orientation of the roller shade. For example, a roller shade may include an installation orientation that allows a shade to be extended to the left and retracted to the right. A roller shade's position may be laterally adjusted concurrently with a longitudinal adjustment relative to the orientation of the roller shade. For example, if the roller shade is installed such that the shade is extended to the left, adjusting a lateral position may adjust move a shade of a roller shade upward and/or downward.

Various described patents have been incorporated by reference. The described patents are incorporated by reference to the extent that no conflict exists between the various described systems and/or processes and the described patents. Any portion, of the described patents that are incorporated by reference, that is conflicting with the various described systems and/or processes are not incorporated by reference.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a tube" includes a combination of two or more tubes and reference to "a roller shade" includes different types and/or combinations of roller shades.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A roller shade assembly comprising:
   a first end;
   an opposing second end;
   a first member, wherein the first member comprises:
      a length; and
      a track disposed along at least a portion of the length of the first member, wherein the track at least partially circumscribes the first member;
   a second member coupled to a shade of the roller shade assembly, wherein the first member is disposed at least partially in the second member;
   a traveling member coupled to the second member, wherein the traveling member is a separate member from the first member and the second member, and wherein the traveling member is configured to move relative to the first member and the second member, and wherein the traveling member is configured to move along the track of the first member to automatically laterally move the shade of a roller shade when the shade is vertically moved.

2. The roller shade assembly of claim 1 wherein the second member is indirectly coupled to the shade.

3. The roller shade assembly of claim 1 further comprising an other member disposed at least partially in the second member and configured to receive at least a portion of the first member, wherein the other member comprises an opening, and wherein the traveling member is disposed in the opening of the other member, and wherein the second member is coupled to the traveling member through the opening of the other member, and wherein automatically laterally moving the shade allows the traveling member to move laterally along the opening in the other tube member while the second member rotates.

4. The roller shade assembly of claim 1 wherein the traveling member includes an opening through which at least a portion of the track is disposed.

5. The roller shade assembly of claim 1 wherein the traveling member comprises:
   a collar; and
   a receiving member, wherein the receiving member comprises one or more protrusions configured to be received by the track.

6. The roller shade assembly of claim 1 wherein the traveling member comprises:
   a collar; and
   a receiving member, wherein the receiving member comprises one or more recesses configured to be received by the track.

7. The roller shade assembly of claim 1 wherein the traveling member includes a guide that is configured to at least partially restrict the movement of the traveling member.

8. The roller shade assembly of claim 1 wherein the traveling member includes at least one of:
   a protrusion configured to be received by the track
   or a recess configured to be received by the track.

9. The roller shade assembly of claim 8 wherein the traveling member includes a guide that is configured to at least partially restrict the movement of the traveling member.

10. A method of moving a shade of a roller shade, the method comprising:
    adjusting a longitudinal position of a shade of a roller shade, wherein the shade is coupled to a first member of the roller shade, and wherein altering the longitudinal position of the shade comprises moving an end of the shade along a plane normal to a length disposed between a first end and a second end of the roller shade; and
    automatically adjusting a lateral position of the shade when the longitudinal position of the shade is adjusted by:
       allowing rotation of the first member of the roller shade to automatically adjust a lateral position of the first member relative to one or more other members of the roller shade;
       wherein rotation of the first member adjusts a position of a traveling member coupled to the first member on a track disposed in one of the one or more other members of the roller shade to adjust the lateral position of the shade,
       and wherein the traveling member is a separate member from the first member and the one or more other members, and wherein the traveling member is configured to move relative to the first member and at least one of the one or more other members.

11. The method of claim 10 wherein the first member of the roller shade and the one or more other members of the roller shade comprise tubes, and wherein one or more of the other members are disposed at least partially in the first member.

12. The method of claim 10 further comprising restricting adjustment of the lateral position, wherein the adjustment of the lateral position is restricted by a recess disposed in the first member, wherein the recess extends laterally along at least a portion of the first member, and wherein the traveling member is disposed at least partially in the recess.

13. A roller shade assembly comprising:
 a set of members, wherein at least two members of the set of members is configured to be at least one of:
  disposed at least partially in another one member of the set of members,
  or receive, in a lumen, at least a portion of one or more members of the set of members;
 a track disposed along at least a portion of a length of one of the two of the members of the set of members and at least partially circumscribing the one of the two of the members of the set of members;
 a traveling member coupled to one of the members of the set of members that is coupled to a shade, wherein the traveling member is a separate member from the two or more members of the set of members, and wherein the traveling member is configured to move relative to the at least two or more members of the set of members, and wherein the traveling member is configured to, in response to vertical movement of the shade, move along the track to automatically laterally move the shade coupled to the one of the members of the set of members when the shade is vertically moved.

14. The roller shade assembly of claim 13 wherein the traveling member is indirectly coupled to the shade.

15. The roller shade assembly of claim 13 wherein the one of the members on which the track is disposed is at least partially disposed at least partially in the one of the members coupled to the shade.

16. The roller shade assembly of claim 13 wherein the set of members comprises at least three members, and wherein the traveling member is coupled to at least one of:
 the two or more members of the set of members,
 at least one of the two or more members of the set of members and at least one other member of the set of members,
 or at least two members of the set of members other than the two or more members of the set of members.

17. The roller shade assembly of claim 13 wherein the traveling member includes at least one protrusion received by the track.

18. The roller shade assembly of claim 13 wherein the traveling member includes at least one recess received by the track.

19. The roller shade assembly of claim 13 wherein the traveling member comprises:
 a collar; and
 a receiving member, wherein the receiving member comprises one or more protrusions configured to be received by the track.

20. The roller shade assembly of claim 13 wherein the traveling member includes a guide that is configured to at least partially restrict the movement of the traveling member.

* * * * *